United States Patent
Anderson et al.

(10) Patent No.: US 12,117,913 B1
(45) Date of Patent: Oct. 15, 2024

(54) SYSTEM DIRECTED TESTING

(71) Applicant: Future Dial, Inc., Sunnyvale, CA (US)

(72) Inventors: Angel Michelle Anderson, Spencer, IN (US); Hongshan Zhang, Cupertino, CA (US)

(73) Assignee: Future Dial, Inc., Sunnyvale, CA (US)

( * ) Notice: Subject to any disclaimer, the term of this patent is extended or adjusted under 35 U.S.C. 154(b) by 37 days.

(21) Appl. No.: 18/186,466

(22) Filed: Mar. 20, 2023

(51) Int. Cl.
G06F 11/00 (2006.01)
G06F 11/22 (2006.01)
G06F 11/273 (2006.01)

(52) U.S. Cl.
CPC ...... *G06F 11/2733* (2013.01); *G06F 11/2294* (2013.01)

(58) Field of Classification Search
CPC .......................... G06F 11/2733; G06F 11/2294
USPC ........................................................ 714/1–57
See application file for complete search history.

(56) References Cited

U.S. PATENT DOCUMENTS

| | | | | |
|---|---|---|---|---|
| 7,853,425 B1* | 12/2010 | Williamson | ....... | G01R 31/2834 714/724 |
| 11,650,249 B1* | 5/2023 | Wang | ................. | G01R 31/2884 324/537 |
| 2005/0176376 A1* | 8/2005 | Liu | ..................... | G01R 29/0821 455/67.11 |
| 2015/0023188 A1* | 1/2015 | Das | ...................... | G01R 31/319 370/252 |

* cited by examiner

*Primary Examiner* — Sarai E Butler
(74) *Attorney, Agent, or Firm* — Greenberg Traurig

(57) ABSTRACT

A method includes selecting a first of a plurality of devices-under-test that has been connected in electronic communication with the test device for a longest period of time compared to others of the plurality of devices-under-test. A first task is performed on the first of the plurality of devices-under-test. After completing the first task, determining whether the test device needs to perform the first task on a second of the plurality of devices-under-test. Causing the first task to be performed on the second of the plurality of devices-under-test or selecting a third of the plurality of devices-under-test that has been connected in electronic communication with the test device for a next longest period of time compared to others of the plurality of devices-under-test.

20 Claims, 4 Drawing Sheets

150

| 152 | Selecting, by a processor of a test device, a first of a plurality of devices-under-test, wherein the first of the plurality of devices-under-test has been connected in electronic communication with the test device for a longest period of time compared to others of the plurality of devices-under-test |

| 154 | Causing, by the processor of the test device, a first task to be performed on the first of the plurality of devices-under-test |

| 156 | In response to completing the first task, determining, by the processor of the test device, whether the test device needs to perform the first task on a second of the plurality of devices-under-test |

| 158 | In response to the determining indicating that the test device needs to perform the first task on the second of the plurality of devices-under-test, causing, by the processor of the test device, the first task to be performed on the second of the plurality of devices-under-test |

| 160 | In response to the determining indicating that the test device does not need to perform the first task on the second of the plurality of devices-under-test, selecting, by the processor of the test device, a third of the plurality of devices-under-test, wherein the third of the plurality of devices-under-test has been connected in electronic communication with the test device for a next longest period of time compared to others of the plurality of devices-under-test |

*FIG. 2*

SYSTEM DIRECTED TESTING

FIELD OF THE TECHNOLOGY

At least some embodiments disclosed herein relate generally to testing electronic devices. More specifically, at least some embodiments relate to directing a particular order for testing of a plurality of electronic devices such as, but not limited to, computing devices.

BACKGROUND

Electronic devices may be tested in batches. In some instances, the batches of electronic devices can arrive for testing at different times and include a number of different tasks to be performed. The different tasks may be performed at different speeds. As a result, an operator executing the tests may manage the testing process. This can cause the testing process to be different across operators and can be inconsistent, even with an individual operator as they make different judgments over time.

BRIEF DESCRIPTION OF THE DRAWINGS

References are made to the accompanying drawings that form a part of this disclosure and illustrate embodiments in which systems and methods described in this Specification can be practiced.

FIG. 2 is a flowchart of a method, according to some embodiments.

Like reference numbers represent the same or similar parts throughout.

DETAILED DESCRIPTION

Computing devices may be tested in batches. In some instances, the batches of computing devices can arrive for testing at different times and include a number of different tasks. The different tasks may be performed at different speeds. As a result, an operator executing the tests may manage the testing process. This can cause the testing process to be different across operators and can be inconsistent, even with an individual operator.

Embodiments of this disclosure are directed to test systems that dictate to an operator the testing process. As a result, an operator is not responsible for choosing an order by which to perform the tasks.

In some embodiments, the test system can be configured based on a service level agreement indicating a maximum time during which the computing devices are able to be tested.

In some embodiments, the test systems can determine a device that has been connected to the test system for a longest period of time, and perform necessary tasks on the device. In some embodiments, after completing the tasks on the device having been connected the longest, the test system can prompt the operator to conduct the same task on other connected devices that need the same task to be performed. After completing the repetitive tasks, the test system can identify the device connected for the next longest period of time.

Figure 1:
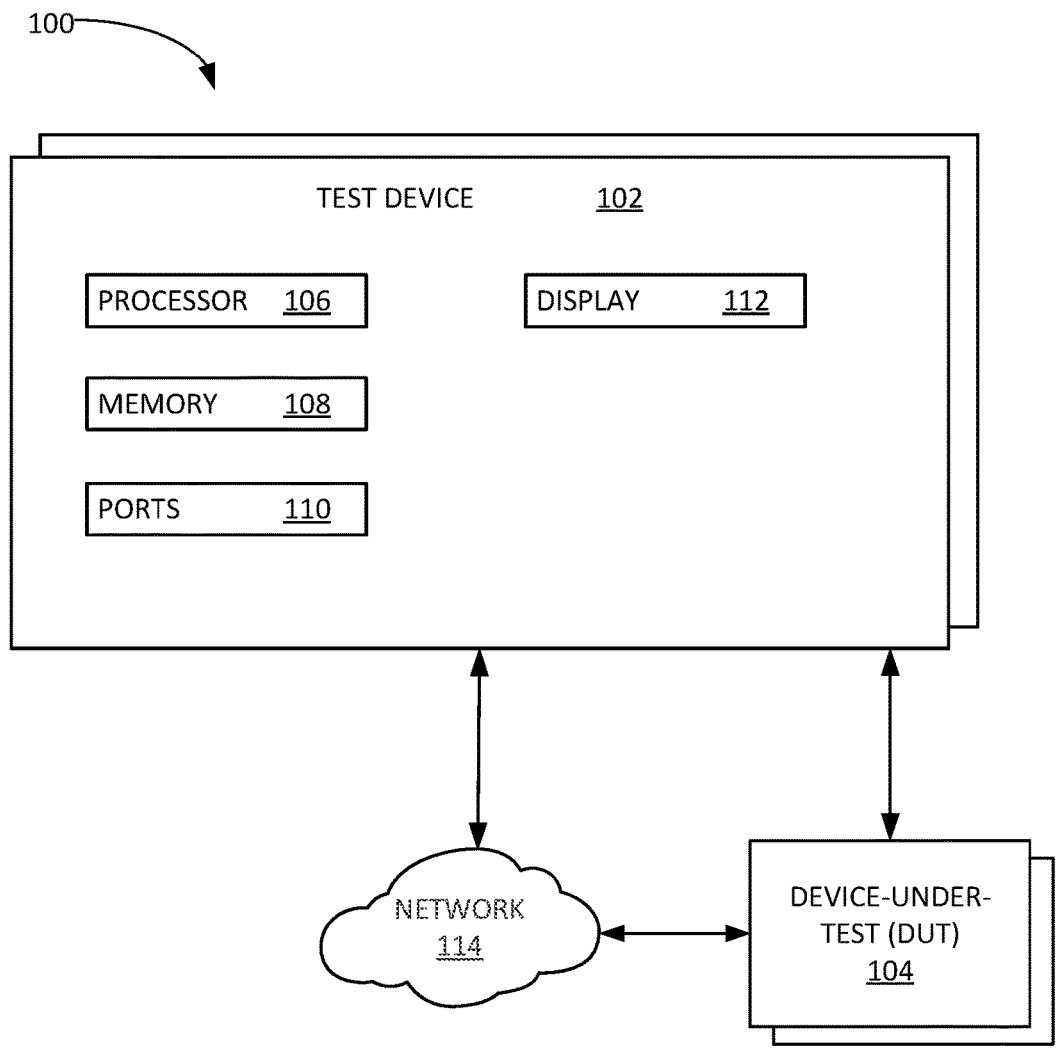
FIG. 1 shows a test system, according to some embodiments.

FIG. 1 shows a test system 100, according to some embodiments. In some embodiments, the test system 100 can be used to, for example, execute one or more tests using a test device 102 on one or more electronic devices (devices-under-test (DUT), i.e., one or more DUTs 104). In some embodiments, the test system 100 can be used to not only test the one or more DUTs 104, but to reconfigure or reprogram them, for example, during a refurbishing process.

The test device 102 includes a processor 106, a memory 108, communication ports 110, and a display 112. The test device 102 can include one or more additional components such as, but not limited to, those shown and described in accordance with FIG. 4 below.

In some embodiments, the one or more DUTs 104 can be connected in electronic communication with the test device 102 via a wired connection between the communication ports 110 and the one or more DUTs 104. In some embodiments, the one or more DUTs 104 can be in electronic communication via a wireless connection. In such embodiments, the test device 102 can connect in electronic communication with the one or more DUTs 104 via a network 114.

In some embodiments, the one or more DUTs 104 can be computing devices such as, but not limited to, mobile computing devices such as smartphones, tablets, wearable computing devices, or the like.

FIG. 2 is a flowchart of a method 150, according to some embodiments. The method 150 can be performed using the test system 100 (FIG. 1). In some embodiments, the method 150 can be performed to improve an efficiency of tasks being performed on a plurality of electronic devices. In some embodiments, the tasks can be ordered so that a first connected one of the one or more DUTs 104 is operated upon, followed by performing the same task on all of the one or more DUTs 104 that need the same task to be performed. As a result, the test operations can be performed on a first connected device, then based on similar tasks, and then continuing to the next connected device. In some embodiments, this can increase an efficiency of the process as there is no consideration by an operator as to which tasks to complete and in which order. Moreover, repetitive tasks are grouped so that efficiency gains can be utilized by repeating the same task.

At block 152, the method 150 includes selecting, by the test device, a first of a plurality of devices-under-test. At block 152, the selected first of the plurality of devices-under-test is the device-under-test that was first connected to the test device (compared to the timing of connection of the other devices-under-test). In some embodiments, the test device can identify which of the devices-under-test was connected based on, for example, timestamps associated with the connection of the devices-under-test that are stored in memory of the test device. In some embodiments, instead of a timestamp, a running order of which devices-under-test were connected in which order can be stored in the memory of the test device. It is to be appreciated that other methods of identifying which device-under-test has been connected to the test device the longest are within the scope of this disclosure.

At block 154, the test device causes a first task to be performed on the first of the plurality of devices-under-test. In some embodiments, the first task can be a task that requires input from an operator. For example, the first task can include swapping a SIM card on the first device-undertest. In some embodiments, the test device can instruct the user to perform the action. In some embodiments, the test device may be able to determine whether the action is complete based upon, for example, the operator pushing a selection on the device-under-test or based on a response from the device-under-test to the test device.

At block 156, the method 150 includes determining, by the test device, whether the test device needs to perform the first task on a second of the plurality of devices-under-test. Block 156 may be executed after the completion of the first task on the first of the plurality of devices-under-test. In some embodiments, block 156 can be executed while the first task is being performed on the first of the plurality of devices-under-test (e.g., concurrently with block 154).

At block 158, the method 150 includes, in response to determining that the test device needs to perform the first task on the second of the plurality of devices-under-test, the test device causes the second of the plurality of devices-under-test to perform the first task.

At block 160, the method 150 includes, in response to determining that the test device does not need to perform the first task on the second of the plurality of devices-under-test, selecting a third of the plurality of devices-under-test. In some embodiments, the third of the plurality of devices-under-test is the device-under-test that has been connected in electronic communication with the test device for a next longest period of time compared to the first of the plurality of devices-under-test. That is, at block 160, the method 150 again searches for the device-under-test that has been connected the longest (and is awaiting a task to be performed).

Figure 3:
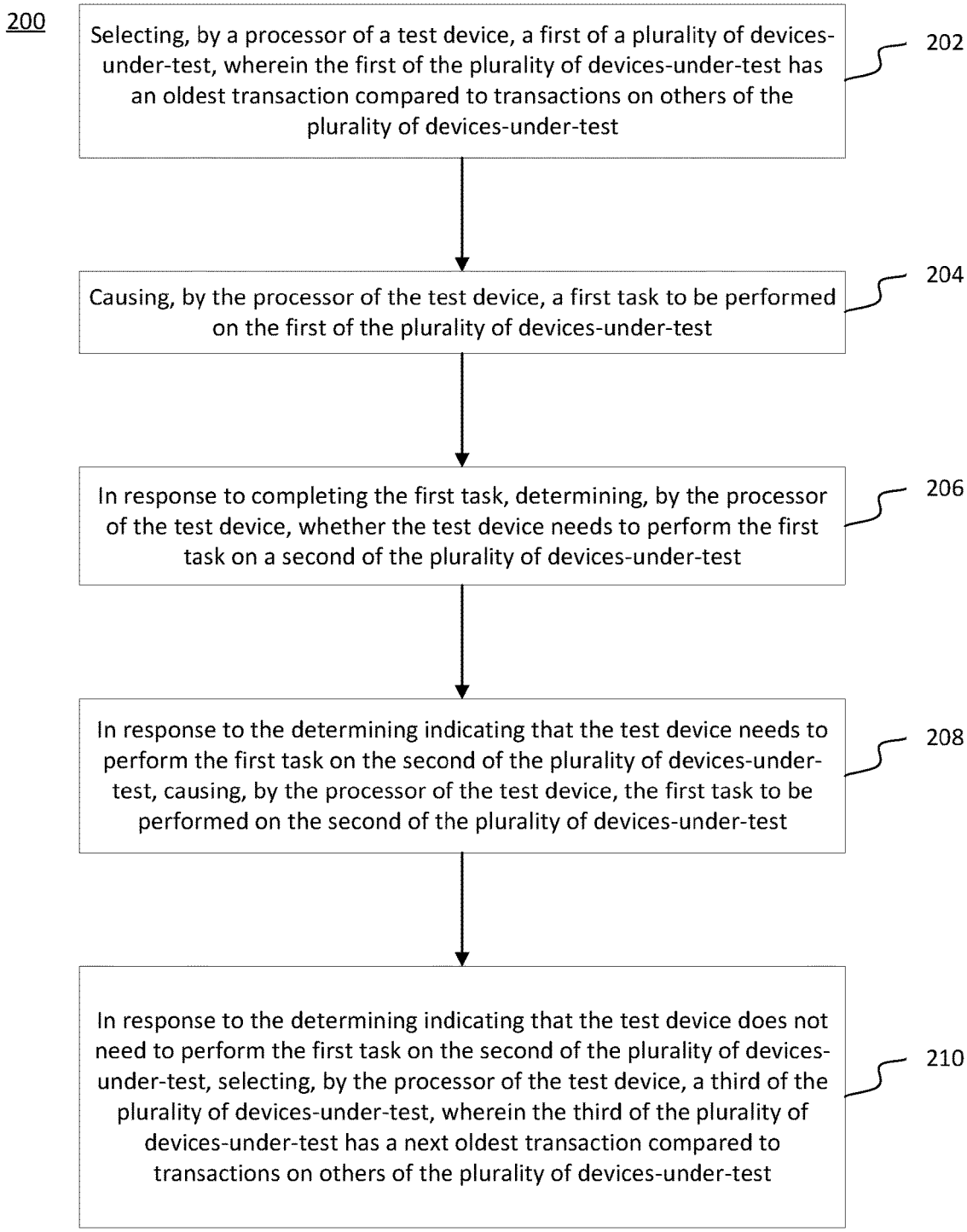
FIG. 3 is a flowchart of a method, according to some embodiments.

FIG. 3 is a flowchart of a method 200, according to some embodiments.

At block 202, the method 200 includes selecting, by a processor of a test device (e.g., the test device 102 of FIG. 1), a first of a plurality of devices-under-test (e.g., the one or more DUTs 104 of FIG. 1). The first of the plurality of devices-under-test has an oldest transaction compared to transactions on others of the plurality of devices-under-test. That is, the test device 102 determines which connected DUT has a longest completed transaction and selects that DUT.

At block 204, the method 200 includes causing a first task to be performed on the first of the plurality of devices-under-test.

At block 206, in response to completing the first task, the method 200 includes determining, by the processor of the test device, whether the test device needs to perform the first task on a second of the plurality of devices-under-test. That is, at block 206 the test system determines whether any of the connected DUTs is waiting for a similar task to the task that was completed at block 204.

At block 208, the method 200 includes causing, by the processor of the test device, the first task to be performed on the second of the plurality of devices-under-test. As a result, the method 200 can lead to similar tasks being repeated. In some embodiments, this can increase an overall efficiency of the testing process.

At block 210, the method 200 includes selecting, by the processor of the test device, a third of the plurality of devices-under-test. Block 210 is performed when there are no repetitive tasks to be performed. The third of the plurality of devices-under-test is the device that has the next longest completed transaction (e.g., relative to the first DUT).

Figure 4:
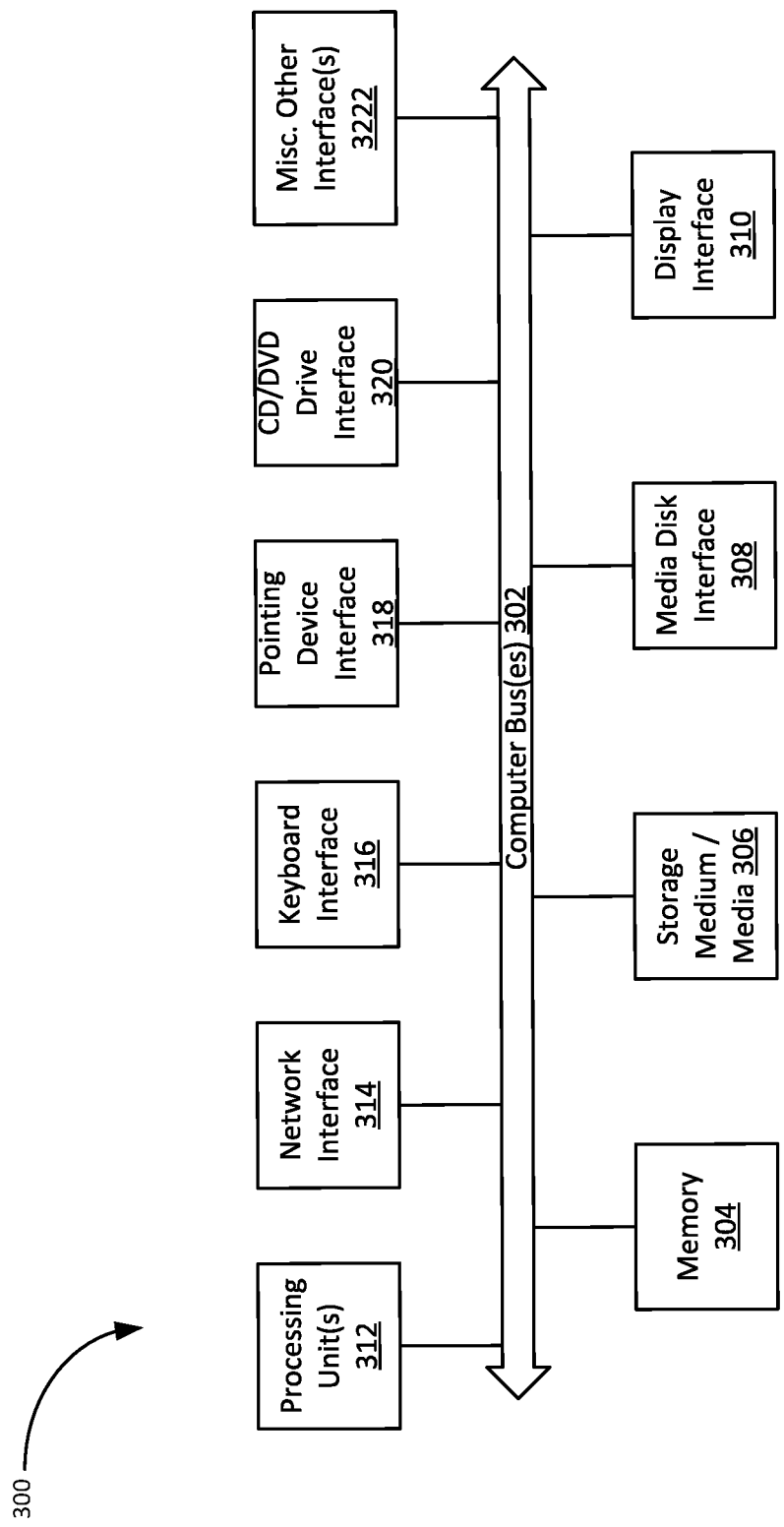
FIG. 4 is a block diagram illustrating an internal architecture of an example of a computer, according to some embodiments.

FIG. 4 is a block diagram illustrating an internal architecture 300 of an example of a computer, such as the test device 102 (FIG. 1) or the one or more DUTs 104 (FIG. 1), according to some embodiments. A computing device as referred to herein refers to any device with a processor capable of executing logic or coded instructions, and could be a server, personal computer, set top box, smart phone, pad computer or media device, to name a few such devices. As shown in the example of FIG. 4, internal architecture 300 includes one or more processing units (also referred to herein as CPUs) 280, which interface with at least one computer bus 302. Also interfacing with computer bus 302 are persistent storage medium/media 306, network interface 314, memory 304, e.g., random access memory (RAM), run-time transient memory, read only memory (ROM), etc., media disk drive interface 308 as an interface for a drive that can read and/or write to media including removable media such as floppy, CD ROM, DVD, etc. media, display interface 310 as interface for a monitor or other display device, keyboard interface 316 as interface for a keyboard, pointing device interface 318 as an interface for a mouse or other pointing device, CD/DVD drive interface 320, and miscellaneous other interfaces 322 not shown individually, such as parallel and serial port interfaces, a universal serial bus (USB) interface, and the like.

Memory 304 interfaces with computer bus 302 so as to provide information stored in memory 304 to CPU 312 during execution of software programs such as an operating system, application programs, device drivers, and software modules that comprise program code, and/or computer executable process operations, incorporating functionality described herein, e.g., one or more of process flows described herein. CPU 312 first loads computer executable process operations from storage, e.g., memory 304, storage medium/media 306, removable media drive, and/or other storage device. CPU 312 can then execute the stored process operations in order to execute the loaded computer-executable process operations. Stored data, e.g., data stored by a storage device, can be accessed by CPU 312 during the execution of computer-executable process operations.

Persistent storage medium/media 306 is a computer readable storage medium(s) that can be used to store software and data, e.g., an operating system and one or more application programs. Persistent storage medium/media 306 can also be used to store device drivers, such as one or more of a digital camera driver, monitor driver, printer driver, scanner driver, or other device drivers, web pages, content files, playlists and other files. Persistent storage medium/media 306 can further include program modules and data files used to implement one or more embodiments of the present disclosure.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Examples of non-transitory computer-readable storage media include, but are not limited to, any tangible medium capable of storing a computer program for use by a programmable processing device to perform functions described herein by operating on input data and generating an output. A computer program is a set of instructions that can be used, directly or indirectly, in a computer system to perform a certain function or determine a certain result. Examples of non-transitory computer-readable storage media include, but are not limited to, a floppy disk; a hard disk; a random access memory (RAM); a read-only memory (ROM); a semiconductor memory device such as, but not limited to, an erasable programmable read-only memory (EPROM), an electrically erasable programmable read-only memory (EEPROM), Flash memory, or the like; a portable compact disk read-only memory (CD-ROM); an optical storage device; a magnetic storage device; other similar device; or suitable combinations of the foregoing.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to convey the substance of their work most effectively to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various presently disclosed embodiments. It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

In some embodiments, a method including: selecting, by a processor of a test device, a first of a plurality of devices-under-test, wherein the first of the plurality of devices-under-test has been connected in electronic communication with the test device for a longest period of time compared to others of the plurality of devices-under-test; causing, by the processor of the test device, a first task to be performed on the first of the plurality of devices-under-test; in response to completing the first task, determining, by the processor of the test device, whether the test device needs to perform the first task on a second of the plurality of devices-under-test; in response to the determining indicating that the test device needs to perform the first task on the second of the plurality of devices-under-test, causing, by the processor of the test device, the first task to be performed on the second of the plurality of devices-under-test; and in response to the determining indicating that the test device does not need to perform the first task on the second of the plurality of devices-under-test, selecting, by the processor of the test device, a third of the plurality of devices-under-test, wherein the third of the plurality of devices-under-test has been connected in electronic communication with the test device for a next longest period of time compared to others of the plurality of devices-under-test.

In some embodiments, a method, wherein the plurality of devices-under-test include mobile computing devices.

In some embodiments, a method, wherein the mobile computing devices include smartphones, tablets, wearable computing devices, or any combination thereof.

In some embodiments, a method, further including: in response to completing the first task on the second of the plurality of devices-under-test, determining, by the processor of the test device, whether the test device needs to perform the first task on a fourth of the plurality of devices-under-test; and in response to determining the test device needs to perform the first task on the fourth of the plurality of devices-under-test, causing, by the processor of the test device, the first task to be performed on the fourth of the plurality of devices-under-test.

In some embodiments, a method, further including: in response to determining the test device does not need to perform the first task on the fourth of the plurality of devices-under-test, selecting, by the processor of the test device, the third of the plurality of devices-under-test.

In some embodiments, a system including: a test device, including: a processor; and a memory, wherein the processor is configured to: select a first of a plurality of devices-under-test, wherein the first of the plurality of devices-under-test has been connected in electronic communication with the test device for a longest period of time compared to others of the plurality of devices-under-test; cause a first task to be performed on the first of the plurality of devices-under-test; in response to completing the first task, determine whether the test device needs to perform the first task on a second of the plurality of devices-under-test; in response to the determining indicating that the test device needs to perform the first task on the second of the plurality of devices-under-test, cause the first task to be performed on the second of the plurality of devices-under-test; and in response to the determining indicating that the test device does not need to perform the first task on the second of the plurality of devices-under-test, select a third of the plurality of devices-under-test, wherein the third of the plurality of devices-under-test has been connected in electronic communication with the test device for a next longest period of time compared to others of the plurality of devices-under-test.

In some embodiments, a system, wherein the plurality of devices-under-test include mobile computing devices.

In some embodiments, a system, wherein the mobile computing devices include smartphones, tablets, wearable computing devices, or any combination thereof.

In some embodiments, a system, wherein the processor is further configured to: in response to completing the first task on the second of the plurality of devices-under-test, determine whether the test device needs to perform the first task on a fourth of the plurality of devices-under-test; and in response to determining the test device needs to perform the first task on the fourth of the plurality of devices-under-test, cause the first task to be performed on the fourth of the plurality of devices-under-test.

In some embodiments, a system, wherein the processor is further configured to: in response to determining the test device does not need to perform the first task on the fourth of the plurality of devices-under-test, select, by the processor of the test device, the third of the plurality of devices-under-test.

In some embodiments, a method including: selecting, by a processor of a test device, a first of a plurality of devices-under-test, wherein the first of the plurality of devices-under-test has an oldest transaction compared to transactions on others of the plurality of devices-under-test; causing, by the processor of the test device, a first task to be performed on the first of the plurality of devices-under-test; in response to completing the first task, determining, by the processor of the test device, whether the test device needs to perform the first task on a second of the plurality of devices-under-test; in response to the determining indicating that the test device needs to perform the first task on the second of the plurality of devices-under-test, causing, by the processor of the test device, the first task to be performed on the second of the plurality of devices-under-test; and in response to the determining indicating that the test device does not need to perform the first task on the second of the plurality of devices-under-test, selecting, by the processor of the test device, a third of the plurality of devices-under-test, wherein the third of the plurality of devices-under-test has been connected in electronic communication with the test device for a next longest period of time compared to others of the plurality of devices-under-test.

In some embodiments, a method, wherein the plurality of devices-under-test include mobile computing devices.

In some embodiments, a method, wherein the mobile computing devices include smartphones, tablets, wearable computing devices, or any combination thereof.

In some embodiments, a method, further including: in response to completing the first task on the second of the plurality of devices-under-test, determining, by the processor of the test device, whether the test device needs to perform the first task on a fourth of the plurality of devices-under-test; and in response to determining the test device needs to perform the first task on the fourth of the plurality of devices-under-test, causing, by the processor of the test device, the first task to be performed on the fourth of the plurality of devices-under-test.

In some embodiments, a method, further including: in response to determining the test device does not need to perform the first task on the fourth of the plurality of devices-under-test, selecting, by the processor of the test device, the third of the plurality of devices-under-test.

In some embodiments, a method, wherein the plurality of devices-under-test are connected in electronic communication with the test device at a same time.

In some embodiments, a method, wherein the oldest transaction compared to transactions on others of the plurality of devices-under-test includes an oldest initiated test action.

In some embodiments, a method, wherein the oldest transaction compared to transactions on others of the plurality of devices-under-test includes an oldest completed test action.

In some embodiments, a method, wherein a transaction includes a connection of a particular device-under-test to the test device.

In some embodiments, a method, wherein a transaction includes an action by the test device or instructed by the test device to an operator of the test device.

All prior patents and publications referenced herein are incorporated by reference in their entireties.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

The terminology used herein is intended to describe embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

What is claimed is:

1. A method comprising:
   selecting, by a processor of a test device, a first of a plurality of devices-under-test, wherein the first of the plurality of devices-under-test has been connected in electronic communication with the test device for a longest period of time compared to others of the plurality of devices-under-test;
   causing, by the processor of the test device, a first task to be performed on the first of the plurality of devices-under-test;
   in response to completing the first task, determining, by the processor of the test device, whether the test device needs to perform the first task on a second of the plurality of devices-under-test;
   in response to the determining indicating that the test device needs to perform the first task on the second of the plurality of devices-under-test, causing, by the processor of the test device, the first task to be performed on the second of the plurality of devices-under-test; and
   in response to the determining indicating that the test device does not need to perform the first task on the second of the plurality of devices-under-test, selecting, by the processor of the test device, a third of the plurality of devices-under-test, wherein the third of the plurality of devices-under-test has been connected in electronic communication with the test device for a next longest period of time compared to others of the plurality of devices-under-test.

2. The method of claim 1, wherein the plurality of devices-under-test include mobile computing devices.

3. The method of claim 2, wherein the mobile computing devices include smartphones, tablets, wearable computing devices, or any combination thereof.

4. The method of claim 1, further comprising:
in response to completing the first task on the second of the plurality of devices-under-test, determining, by the processor of the test device, whether the test device needs to perform the first task on a fourth of the plurality of devices-under-test; and
in response to determining the test device needs to perform the first task on the fourth of the plurality of devices-under-test, causing, by the processor of the test device, the first task to be performed on the fourth of the plurality of devices-under-test.

5. The method of claim 4, further comprising:
in response to determining the test device does not need to perform the first task on the fourth of the plurality of devices-under-test, selecting, by the processor of the test device, the third of the plurality of devices-under-test.

6. A system comprising:
a test device, comprising:
a processor; and
a memory,
wherein the processor is configured to:
select a first of a plurality of devices-under-test, wherein the first of the plurality of devices-under-test has been connected in electronic communication with the test device for a longest period of time compared to others of the plurality of devices-under-test;
cause a first task to be performed on the first of the plurality of devices-under-test;
in response to completing the first task, determine whether the test device needs to perform the first task on a second of the plurality of devices-under-test;
in response to the determining indicating that the test device needs to perform the first task on the second of the plurality of devices-under-test, cause the first task to be performed on the second of the plurality of devices-under-test; and
in response to the determining indicating that the test device does not need to perform the first task on the second of the plurality of devices-under-test, select a third of the plurality of devices-under-test, wherein the third of the plurality of devices-under-test has been connected in electronic communication with the test device for a next longest period of time compared to others of the plurality of devices-under-test.

7. The system of claim 6, wherein the plurality of devices-under-test include mobile computing devices.

8. The system of claim 7, wherein the mobile computing devices include smartphones, tablets, wearable computing devices, or any combination thereof.

9. The system of claim 6, wherein the processor is further configured to:
in response to completing the first task on the second of the plurality of devices-under-test, determine whether the test device needs to perform the first task on a fourth of the plurality of devices-under-test; and
in response to determining the test device needs to perform the first task on the fourth of the plurality of devices-under-test, cause the first task to be performed on the fourth of the plurality of devices-under-test.

10. The system of claim 9, wherein the processor is further configured to:
in response to determining the test device does not need to perform the first task on the fourth of the plurality of devices-under-test, select, by the processor of the test device, the third of the plurality of devices-under-test.

11. A method comprising:
selecting, by a processor of a test device, a first of a plurality of devices-under-test, wherein the first of the plurality of devices-under-test has an oldest transaction compared to transactions on others of the plurality of devices-under-test;
causing, by the processor of the test device, a first task to be performed on the first of the plurality of devices-under-test;
in response to completing the first task, determining, by the processor of the test device, whether the test device needs to perform the first task on a second of the plurality of devices-under-test;
in response to the determining indicating that the test device needs to perform the first task on the second of the plurality of devices-under-test, causing, by the processor of the test device, the first task to be performed on the second of the plurality of devices-under-test; and
in response to the determining indicating that the test device does not need to perform the first task on the second of the plurality of devices-under-test, selecting, by the processor of the test device, a third of the plurality of devices-under-test, wherein the third of the plurality of devices-under-test has a next oldest transaction compared to transactions on others of the plurality of devices-under-test.

12. The method of claim 11, wherein the plurality of devices-under-test include mobile computing devices.

13. The method of claim 12, wherein the mobile computing devices include smartphones, tablets, wearable computing devices, or any combination thereof.

14. The method of claim 11, further comprising:
in response to completing the first task on the second of the plurality of devices-under-test, determining, by the processor of the test device, whether the test device needs to perform the first task on a fourth of the plurality of devices-under-test; and
in response to determining the test device needs to perform the first task on the fourth of the plurality of devices-under-test, causing, by the processor of the test device, the first task to be performed on the fourth of the plurality of devices-under-test.

15. The method of claim 14, further comprising:
in response to determining the test device does not need to perform the first task on the fourth of the plurality of devices-under-test, selecting, by the processor of the test device, the third of the plurality of devices-under-test.

16. The method of claim 11, wherein the plurality of devices-under-test are connected in electronic communication with the test device at a same time.

17. The method of claim 11, wherein the oldest transaction compared to transactions on others of the plurality of devices-under-test includes an oldest initiated test action.

18. The method of claim 11, wherein the oldest transaction compared to transactions on others of the plurality of devices-under-test includes an oldest completed test action.

19. The method of claim 11, wherein a transaction includes a connection of a particular device-under-test to the test device.

20. The method of claim 11, wherein a transaction includes an action by the test device or instructed by the test device to an operator of the test device.

\* \* \* \* \*